United States Patent
Buening

[19]

[11] Patent Number: 5,836,110
[45] Date of Patent: *Nov. 17, 1998

[54] REMOTE MANUAL ANTI-BACKDRIVE SYSTEM FOR MODULAR REAR-MOUNTED WINDOW ASSEMBLY

[75] Inventor: Dennis J. Buening, Northville, Mich.

[73] Assignee: Excel Industries, Inc., Elkhart, Ind.

[ * ] Notice: The term of this patent shall not extend beyond the expiration date of Pat. No. 5,775,029.

[21] Appl. No.: 726,055

[22] Filed: Sep. 27, 1996

Related U.S. Application Data

[63] Continuation-in-part of Ser. No. 624,130, Mar. 29, 1996.

[51] Int. Cl.⁶ .................................................. E05F 11/06
[52] U.S. Cl. .......................... 49/360; 49/380; 192/8 C; 74/89.22
[58] Field of Search ............... 49/118, 121, 360, 49/352, 380, 347, 349, 139, 140, 331, 332; 296/223; 74/89.22; 192/8 C, 7

[56] References Cited

U.S. PATENT DOCUMENTS

| | | | |
|---|---|---|---|
| 1,833,615 | 11/1931 | Myers | 192/8 C |
| 1,877,288 | 9/1932 | Field | 192/8 C |
| 1,954,211 | 4/1934 | Nicholson | 192/8 C |
| 1,965,878 | 7/1934 | Briggs | 192/8 C |
| 1,997,646 | 4/1935 | Miller | 192/8 C |
| 2,001,758 | 5/1935 | Zwierzina | 192/8 C |
| 2,145,666 | 1/1939 | Roethel | 192/8 C |
| 2,555,859 | 6/1951 | Rappl et al. | 49/352 |
| 3,028,157 | 4/1962 | Batley | 49/352 |
| 4,026,071 | 5/1977 | Sessa | 49/352 |
| 4,081,926 | 4/1978 | Jardin | 296/223 |
| 4,314,692 | 2/1982 | Brauer et al. | 49/352 |
| 4,390,203 | 6/1983 | Lutz et al. | 296/223 |
| 4,420,184 | 12/1983 | Kaltz | 296/223 |
| 4,561,224 | 12/1985 | Jelens . | |
| 4,651,854 | 3/1987 | Harada | 192/8 C |
| 4,850,139 | 7/1989 | Tiesler . | |
| 4,920,698 | 5/1990 | Friese et al. . | |
| 4,926,987 | 5/1990 | Honma | 192/8 C |
| 4,953,676 | 9/1990 | Yamada et al. | 192/8 C |
| 4,995,195 | 2/1991 | Olberding et al. | 49/380 |
| 5,069,502 | 12/1991 | Sekine et al. | 296/223 |
| 5,146,712 | 9/1992 | Hlavaty | 49/118 |
| 5,442,880 | 8/1995 | Gipson | 49/380 |
| 5,505,023 | 4/1996 | Gillen et al. | 49/380 |
| 5,522,191 | 6/1996 | Wenner . | |
| 5,528,861 | 6/1996 | Beyerlein | 49/349 |
| 5,531,046 | 7/1996 | Kollar et al. | 49/118 |
| 5,542,214 | 8/1996 | Buening . | |
| 5,613,323 | 3/1997 | Buening | 49/380 |

*Primary Examiner*—Daniel P. Stodola
*Assistant Examiner*—Curtis Cohen
*Attorney, Agent, or Firm*—Banner & Witcoff, Ltd.

[57] ABSTRACT

A modular window assembly has a glazing pane, typically a slider assembly incorporating a vertically mounted transparent pane, which is slidably mounted in a rear-mounted frame. The slider pane is mounted for moving laterally back and forth between a closed and an open position. A drive subassembly comprises a drive drum and handle remotely mounted in the passenger compartment for moving the sliding pane back and forth between the open and closed positions. An anti-backdrive subassembly is connected to the drive drum and the handle to substantially prevent opening or closing of the slider pane by forces other than operation of the handle. The drive subassembly further comprises a mechanism for operatively connecting the handle to the sliding pane, for example, a drive cable mounted in the roof above a roof liner. When the handle is rotated in either direction, the drive drum wraps and unwraps corresponding segments of the drive cable, pulling the sliding pane between its open and closed position. When a force is exerted directly on the sliding pane, the anti-backdrive device substantially prevents rotation of the drive drum and correspondingly, movement of the sliding pane.

24 Claims, 10 Drawing Sheets

REMOTE MANUAL ANTI-BACKDRIVE SYSTEM FOR MODULAR REAR-MOUNTED WINDOW ASSEMBLY

This application is a continuation in part application of U.S. application Ser. No. 08/624,130.

INTRODUCTION

The present invention is directed to a motor vehicle window assembly and, more particularly, to a modular window assembly in which a sliding pane is vertically mounted in a frame for sliding laterally back and forth between an open and closed position, operated by a remote manual drive apparatus having an anti-backdrive subassembly.

BACKGROUND

Motor vehicle window assemblies having one or more laterally sliding panes, that is, panes which slide substantially horizontally in the vertical plane of the pane, may be either manually operated or operated by electric motor. Such window assemblies are used, for example, as rear slider windows for pickup truck cabs, typically having a circumferential (that is, outer peripheral) frame in which are mounted a sliding pane along with one or more fixed panes. The frame may be structural or semi-structural in that it integrates the sliding pane and one or more fixed-position panes as a self-contained preassembled module suitable for shipping and handling during installation into a motor vehicle.

A window assembly for a vehicle having a sliding pane is shown in U.S. Pat. No. 4,850,139 to Tiesler. In the Tiesler design the sliding window is manually operated. The window of Tiesler has a locking means which must be released in order to open the window. To operate the window, the window itself, or its frame, must be grasped and when pushed or pulled. Once the locking means is released and the window is partially open, no resistance is provided to prevent further opening of the window. The security of the interior of the vehicle is therefore potentially corrupted once the locking means is released. In addition, the driver, or other person opening the sliding window must be able to reach the sliding window in order to open and close it. When operating the sliding window while driving, drivers may find themselves in an awkward position. In a pick-up truck with an extended cab, that is, one with a backseat or an area extending behind the driver, the driver may have to stop the vehicle and get into the rear of the cab area, in order to reach the sliding window and thereby open or close it.

Window assemblies are shown in U.S. Pat. No. 4,920,698 to Friese et al. The Friese et al. window assemblies are replacements for the OEM (original equipment manufacturer) rear slider window assembly originally included in a vehicle when it was new. The Friese et al. window assembly includes right side and left side fixed panes and a sliding center pane powered by an electric motor. Electric drive arrangements may in certain applications present reliability concerns and increased manufacture, installation and repair costs. It would be highly desirable for meeting increasingly stringent OEM requirements of the major motor vehicle manufacturers to have a reliable, less complex remote drive system for a sliding window assembly, especially a sliding window assembly wherein the sliding pane in its closed position can be flush with adjacent fixed panes.

It would be advantageous to have a remote manual drive system for operating the window within arms reach of the driver which would allow them to operate the window while driving the vehicle and substantially prevent opening of the window by any forces other than operation of the remote manual drive system.

It is an object of the present invention to provide improved motor vehicle window assemblies which reduce or wholly overcome some or all of the aforesaid difficulties inherent in prior known window assemblies. Additional objects and optional features of the invention will be apparent from the following disclosure and detailed discussion of preferred embodiments.

SUMMARY

In accordance with a first aspect a rear-mounted modular window assembly in a motor vehicle has a glazing pane, typically a slider subassembly incorporating a vertically mounted transparent pane, which is slidably mounted in a circumferential rear-mounted frame. The slider pane is mounted for sliding laterally back and forth between an open position and a closed position. A drive subassembly comprises a hand-operable drive unit for moving the sliding pane back and forth between the open and closed positions, located remotely from the rear-mounted frame. The modular window assembly is "rear-mounted", in that the laterally sliding pane is wholly or at least substantially behind the driver's seat. A handle of the drive unit for operating the sliding pane is mounted within the passenger compartment remotely from the modular window assembly, that is, the handle is not directly secured to, supported by, or mounted to the modular window assembly or its frame, but rather is mounted elsewhere in the passenger compartment. An anti-backdrive subassembly is provided to substantially prevent opening of the window by forces other than rotation of the handle.

In accordance with certain preferred embodiments, the handle is operatively connected to the modular window assembly by suitable drive linkage means, including a drive cable and associated fittings, etc. The drive cable is secured to a drive drum which is rotated by the drive unit handle. The anti-backdrive subassembly, typically between the handle and the drive drum, preferably comprises a camming member engaging the drive drum, a drive plate, a biasing member and a housing, each nested about a stem, the stem being connected at a first end to the handle. When the handle is rotated in either direction, the drive plate rotates with the stem and engages the biasing member, typically a coil spring, which then compresses and rotates within the housing. The biasing member in turn engages the camming member which rotates the drive drum, allowing the drive cable to move the sliding pane between its open and closed positions. When a force is exerted directly on the sliding pane, the drive cable rotates the drive drum and the camming member correspondingly engages the coil spring which expands until it is constrained within the housing, thereafter substantially preventing further rotation of the drive drum and movement of the sliding pane.

A significant advantage is provided in certain preferred embodiments via the remotely located anti-backdrive subassembly since it substantially prevents operation of the slider subassembly by forces other than rotation of the handle. If the window has been left partially open, it cannot be substantially further opened simply by pushing or pulling on the window. The engagement of the camming member and the biasing member prevents any substantial additional rotation of the drive drum and hence operation of the window. This results in added security for the vehicle and its contents.

From the foregoing disclosure, it will be readily apparent to those skilled in the art, that is, to those who are knowledgeable or experienced in this area of technology, that the present invention provides a significant technological advance. The window construction disclosed here is well-suited to applications involving original motor vehicle installations and to applications involving retrofitting of a rear slider window construction installed originally as a manual-slide type window. These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein.

The figures referred to above are not drawn necessarily to scale and should be understood to present a simplified representation of the invention, illustrative of the basic principles involved. Some features of the window construction depicted in the drawings have been enlarged or distorted relative to others to facilitate explanation and understanding. The same reference numbers are used in the drawings for similar or identical components and features shown in various alternative embodiments. Window assemblies incorporating a slider pane as disclosed above, will have configurations and components determined, in part, by the intended application and use environment

DETAILED DESCRIPTION OF CERTAIN PREFERRED EMBODIMENTS

Unless otherwise stated, or otherwise clear from the context below, directional references used here are based on the orientation of components and assemblies shown in the appended drawings. These directional references assume a window assembly mounted as the rear window in the cab or passenger compartment of a motor vehicle, such as a pickup truck or the like. Thus, an interior surface of the window faces into the passenger compartment. An exterior surface faces rearward of the vehicle. The lateral directions are right and left as one faces from the back to the front of the vehicle. The slider pane in window constructions disclosed here are laterally slidable in the sense that they slide horizontally and substantially left and right in the plane of the slider pane. In window constructions having slider panes which are positioned flush with adjacent fixed-position panes, the slider pane may be slightly offset during initial lateral sliding movement, so as to clear the adjacent fixed-position pane as the slider pane moves to its open position. Reference to an inside surface of a window pane is intended to mean that surface which faces into the vehicle passenger compartment. The following detailed description of certain preferred embodiments will focus on window constructions adapted for use as a rear slider in a pickup truck cab. Those skilled in the art will recognize from this disclosure, however, that alternative applications are possible, such as rear-mounted motor vehicle side windows calling for a slider pane mounted within a frame for lateral sliding between an open and a closed position. In a side window application, such lateral sliding typically would involve fore-and-aft travel of the slider pane relative to the vehicle body.

Figure 1:
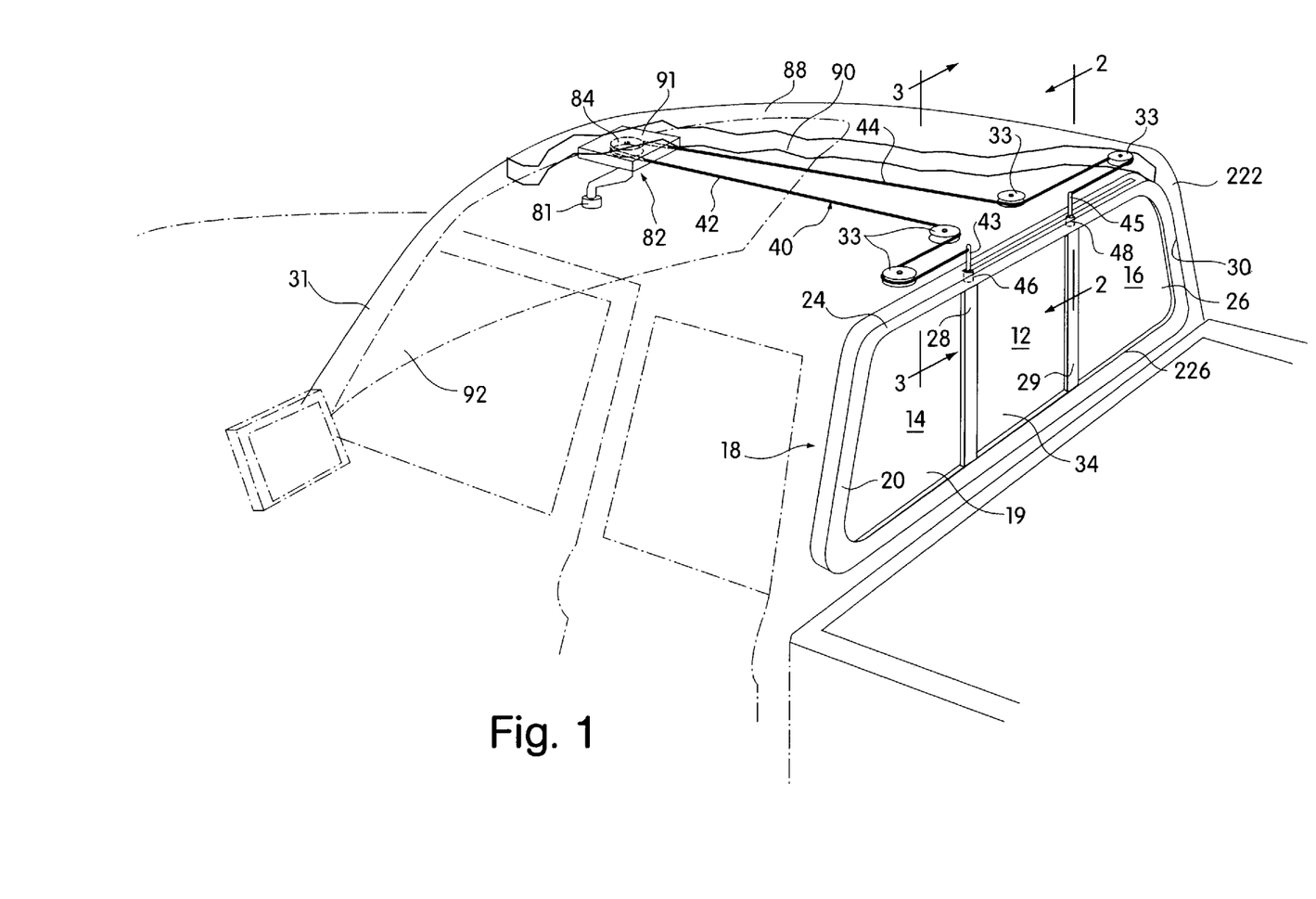
FIG. 1 is an exterior schematic perspective view of a multi-pane modular sliding window assembly vertically mounted as a rear slider window in a pickup truck cab or the like, incorporating a center slider pane mounted within a frame between right and left side fixed-position panes, and a pull-pull drive cable arrangement, in which a cable drive subassembly includes a backdrive subassembly and a handle remotely mounted to the motor vehicle body, in accordance with a first preferred embodiment.

The window construction schematically illustrated in FIG. 1 is a rear slider in a pickup truck cab, having a center mounted slider pane 12 positioned (in its closed position) between right side and left side fixed-position panes 16, 14, respectively. The slider pane and fixed position panes are mounted in a circumferential frame 18 having substantially vertical right and left portions 222, 20, respectively, interconnected by substantially horizontal upper and lower frame portions 24, 26, respectively. In addition, optional left and right mullions, i.e., vertical frame portions 28, 29 are positioned at the junction of the slider pane (again, in its closed position) with right side fixed position pane 16 and left side fixed position pane 14, respectively. The window construction is seated in a window opening 30 defined by vehicle body 31 at the rear of the passenger compartment. Thus, the window construction is oriented in a generally vertical plane. Suitable positioning means may be employed, such as a so-called halo molding, to facilitate the proper positioning of the window construction in the window opening 30. In this regard, the frame 18 is said to be circumferential in the sense that it forms a complete or substantially complete perimeter around the glazing panes. Preferably the frame integrates the window construction, such that the window construction is structural or semi-structural in the sense that it is sufficiently self-supporting as a preassembled self-contained module, to withstand stresses placed upon it during shipping, handling and installation into the motor vehicle window opening.

In accordance with current design preferences, the circumferential frame preferably includes at least one unitary full-circumference member extending all the way around the perimeter. Such full-circumference member can be formed by injection molding in-place around the fixed-position panes employing suitable plastics such as, for example, Geloy® which is commercially available from General Electric Company. Slider travel channels for guiding the sliding pane in its lateral movement between the open and closed positions can be molded into the frame and/or formed in whole or in part by separately attached channel members formed of metal, plastic, etc. The frame may further comprise appliqués and the like to provide decorative "show" surfaces, that is, surfaces which will be exposed to view during normal use of the window construction when it is installed in the motor vehicle window opening. It will be within the ability of those skilled in the art, given the benefit of the present disclosure, to design and construct frames suitable to specific applications.

The window construction of FIG. 1 further comprises a pull-pull cable drive subassembly 82 for moving the slider pane 12 between its opened and closed positions. Drum housing 91, containing drive drum 84, is mounted to roof 88 of the vehicle between the roof 88 and the roof liner 90, preferably proximate windshield 92. Handle 81 is connected to drive drum 84 for rotating drive drum 84. Handle 81 is connected to drive drum 84 via anti-backdrive subassembly 120 which is discussed in detail below in reference to FIGS. 6 and 7. Handle 81 is preferably mounted overhead and within arms reach of the driver. The handle 81 may be located in the center of the vehicle proximate a perimeter of the windshield 92 or more centrally located in the passenger compartment. Such positioning of the handle 81 provides increased ease of use and convenience for the driver. Handle 81 may be a crank arm, a round knob, or any other suitable device apparent to those skilled in the art given the benefit of this disclosure. It is to be appreciated that in a vehicle with a sunroof, the cable drive subassembly may be mounted to the roof rearward of the sunroof.

Drive cable 40 is connected to drive drum 84 and slider pane 12 in order to move slider pane 12 upon rotation of handle 81. Further discussion concerning the connection of drive cable 40 to drive drum 84 is provided below with respect to FIGS. 6 and 7. Drive cable 40 preferably extends between the roof 88 and the roof liner 90, which conceals the cable from view and adds to the aesthetics of the passenger compartment of the vehicle. It will be within the ability of those skilled in the art to implement suitable guide means such as pulleys for routing drive cable 40 between the roof liner 90 and the roof 88.

Drive cable 40 includes a first segment 42 extending from the left of slider pane 12 to cable drive subassembly 82 at which point it is wrapped around drive drum 84 and secured thereto. A second segment 44 extends from the right of slider pane 12 to cable drive subassembly 82 at which point it too is wrapped around drive drum 84 and secured thereto. More specifically, cable segment 42 has a first end 43 attached to an attachment block 46 at a first location on the transparent pane 12 and a second end (not shown) attached to drive drum 84. As best seen in FIG. 1, such first location is the upper left corner of the slider pane 12. Similarly, cable segment 44 has a first end 45 attached to the slider block 48 at a second location on slider pane 12, the upper right corner of the slider pane, and a second end 83 (see FIG. 6) attached to drive drum 84.

Figure 2:
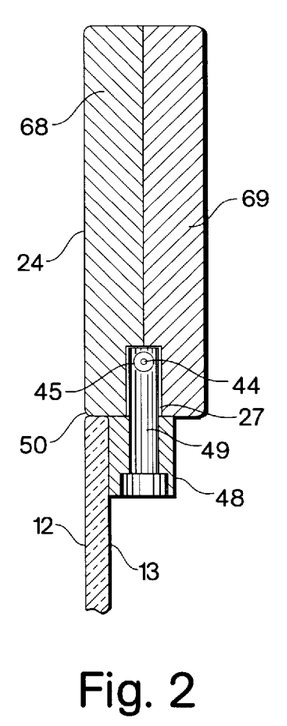
FIG. 2 is a cross-sectional view taken through line 2—2 of FIG. 1, showing attachment of a drive cable to the slider pane.

Typically, the slider pane 12 will be a substantially quadrilateral transparent pane having a peripheral edge which includes an upper horizontal edge portion 50 (see FIG. 2). In accordance with certain preferred embodiments the upper horizontal edge 50 of the slider pane is substantially frameless other than the attachment blocks 46, 48 or other means provided there for guiding the transparent pane's travel between its open and closed positions. The slider subassembly incorporating the transparent slider pane may further comprise guide means along the upper horizontal peripheral edge for guiding travel, componentry of a latch or locking mechanism (typically, adhered to the inside surface 13 of the slider pane) and/or other devices suitable to the intended application of the window construction. Weather sealing can be provided about the perimeter of the sliding pane in accordance with known techniques including, for example, the use of blade seals and O-seals affixed to the frame 18, slider pane 12 and/or adjacent fixed-position panes 14, 16. Alternative sealing materials and techniques are well known and will be readily apparent to those skilled in the art for use in the present modular window assemblies given the benefit of the present disclosure.

Preferably, drive cable 40 is of the cable type having an outer sheath or conduit over at least a portion of the drive cable. In accordance with certain highly preferred embodiments, the left and right segments 42, 44 of drive cable 40 are attached to the horizontal upper portion 24 of frame 18 by securing corresponding ends of the conduit thereto. It will be within the ability of those skilled in the art, given the benefit of the present disclosure, to employ suitable cable guide means, such as guides 33 shown in FIG. 1, for mounting and guiding the travel path of the drive cable from the remotely mounted cable drive subassembly 82 to the window frame 18 along the roof 88, between the roof liner 90 and the roof. Guides 33 may be pulleys or any other known guide means. Also, tensioning means can be provided, for example, a standard threaded fitting positioned in-line with the conduit.

Figure 3:
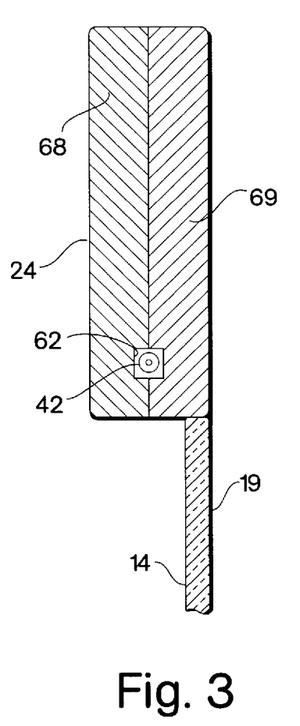
FIG. 3 is a cross-sectional view taken through line 3—3 of FIG. 1, showing a second segment of the drive cable extending in a cable channel formed in the upper horizontal portion of the window frame, the cable channel having a closed cross-sectional configuration.

Turning now to FIG. 3, cable segment 42 can be seen carried within internal cable channel 62 formed within upper frame portion 24. Cable channel 62 can be formed by mating inner and outer frame components 68, 69. Thus, in certain preferred embodiments, frame component 68 is provided as an appliqué onto frame component 69 which is a full-circumferential frame member. The resulting cable channel 62 is seen to have a closed cross-sectional configuration. That is, it is not downwardly open, for example, as is U-shaped slider travel channel 51 in the embodiment of FIG. 4, but rather is O-shaped (or has a square cross-sectional configuration, etc.) so as to protect and/or hide from view that portion of the drive cable which is within the cable channel 62.

In FIG. 2, upper frame portion 24 can be seen to form a slider travel channel 27 which receives a guide pin 49 extending upwardly from right-hand side attachment block 48. A corresponding guide pin extends upwardly from the left-hand side attachment block 46, such that the slider pane 12 is guided in its travel along the slider travel channel 27 between its open and closed positions. The guide pins extending from the slider pane into slider travel channel 27 optionally are spring-loaded or otherwise biased in the vertical direction to reduce or eliminate window raffle. This feature also advantageously facilitates the assembly and disassembly of the window construction by permitting the guide pins to be retracted for installing or removing the slider pane 12 from the slider travel channel 27 in the frame 18. In accordance with certain preferred embodiments, the aforesaid closed cross-sectional configuration cable channel 62 is a lateral extension of, and in axial alignment with, the downwardly open slider travel channel 27. The conduit attachment brackets discussed below, or equivalent cable mounting items, are secured to the frame or to fixed-position panes at locations laterally remote from the slider pane. That is, they are mounted not on or to the slider pane or slider subassembly, but rather are laterally spaced from the slider pane's entire travel range within the frame. The slider pane (or some part of the slider assembly) at its travel end points, that is, at the extreme ends of its travel range within the frame, optionally can contact the cable attachment bracket or other such item and even use it as a travel stop to define an end point of its travel range. In any event, however, the entry points of the drive cable into the frame are laterally outward of the end points of the slider travel range.

Figure 4:
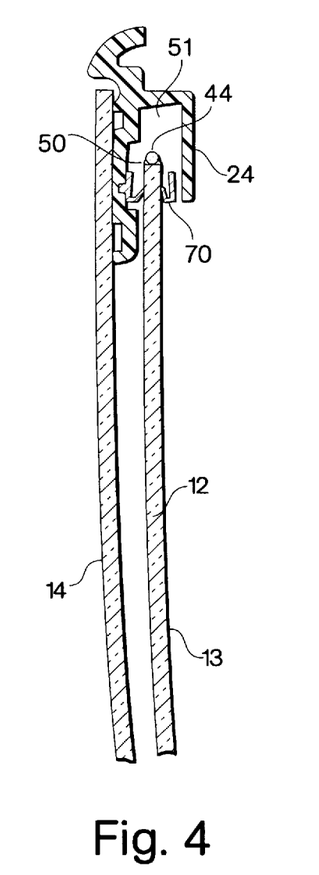
FIG. 4 is a schematic cross-sectional view corresponding to the view of FIG. 2 and illustrating an alternative embodiment for attachment of the drive cable to the slider pane.

Referring again to the embodiment of FIG. 4, an alternative means is illustrated there for attachment of the drive cable to the slider pane. In FIG. 4 the end of drive cable segment 44 is directly bonded to frameless upper peripheral edge 50 of slider pane 12. As noted above, upper frame portion 24 defines a downwardly open U-shaped slider travel channel 51 in the embodiment of FIG. 4, which slidingly receives the upper peripheral edge 50 of slider pane 12 along with the attached drive cable bonded thereto. Preferably, slider travel channel liners and/or seal members 70 are fitted into slider travel channel 51 for purposes of improved operation, sight shielding, etc.

Figure 5:
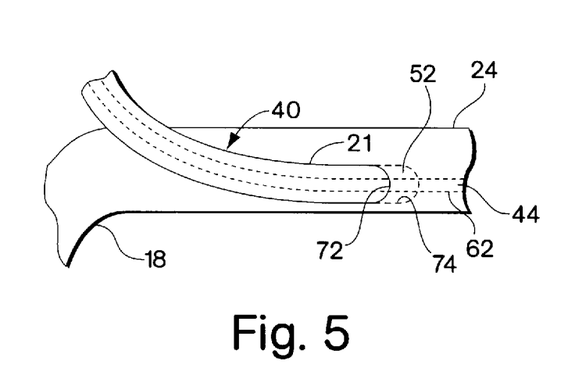
FIG. 5 is a schematic illustration, partially broken away, of an alternative preferred embodiment for entry of the drive cable into the window frame of the embodiment of FIG. 1.

Another alternative embodiment is illustrated in FIG. 5, wherein right side cable segment 44 enters upper frame portion 24 (viewed from inside the passenger compartment facing the rear of the vehicle) at an entry point 72. The frame 18 preferably forms a socket 74 to receive the end 52 of the conduit 21 of cable segment 44. Conduit socket 74 communicates with cable channel 62 through which, as described above, the cable segment 44 extends laterally to its connection with the slider pane 12. A corresponding arrangement for the cable entry point on the opposite side (that is, the left side) of the frame, can be provided in accordance with the same design principles described here for the right side entry point. It will be recognized that the conduit socket can be formed in accordance with well known and cost effective molding and milling techniques. In accordance with the principles discussed above, the left and right cable entry points in accordance with the embodiment of FIG. 5 are laterally remote from the corresponding left and right end points of the slider pane 12 lateral travel range.

Figure 6:
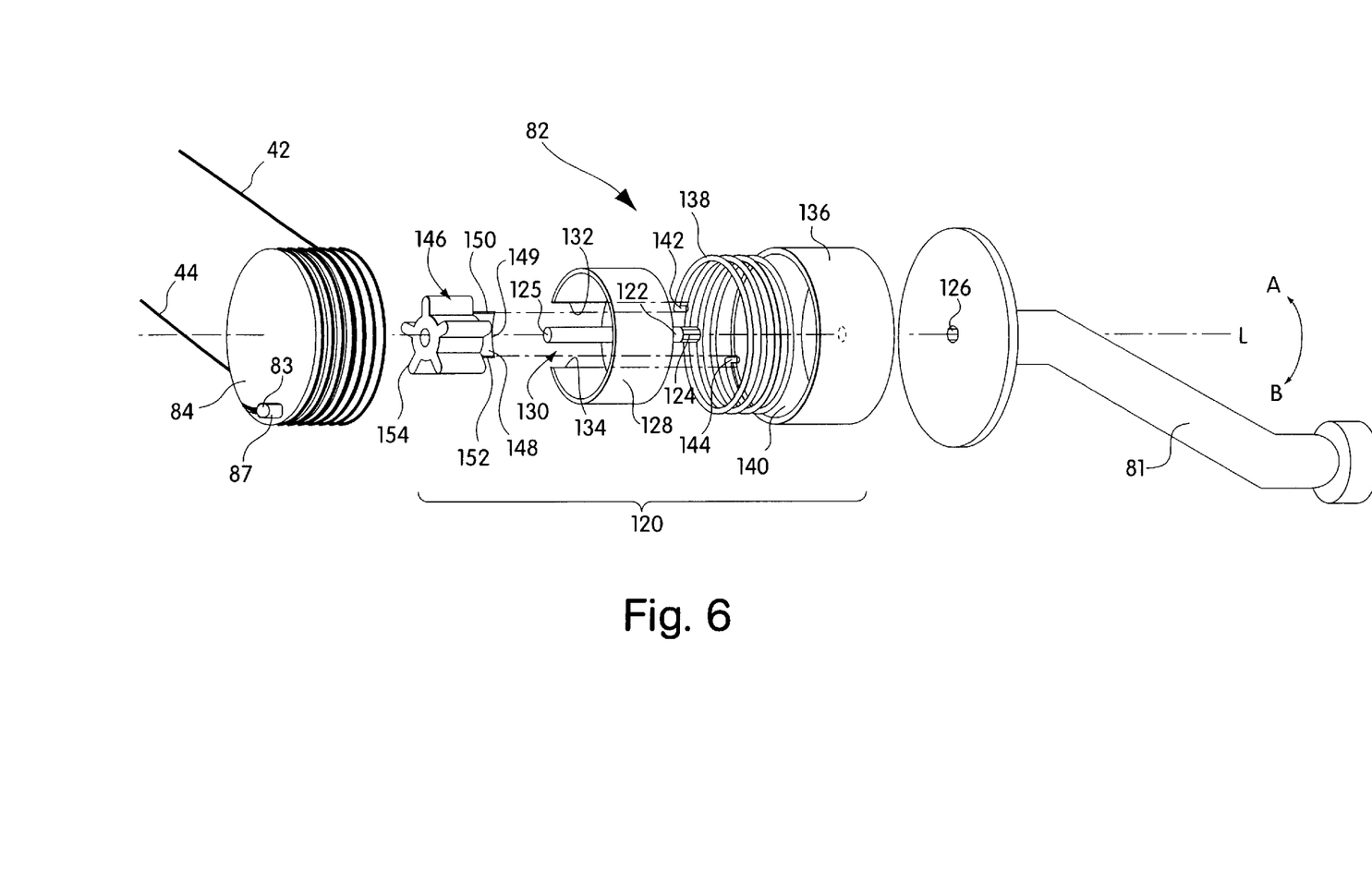
FIG. 6 is an exploded schematic view of the anti-backdrive subassembly, the handle and the drive drum of the embodiment of FIG. 1.
Figure 7:
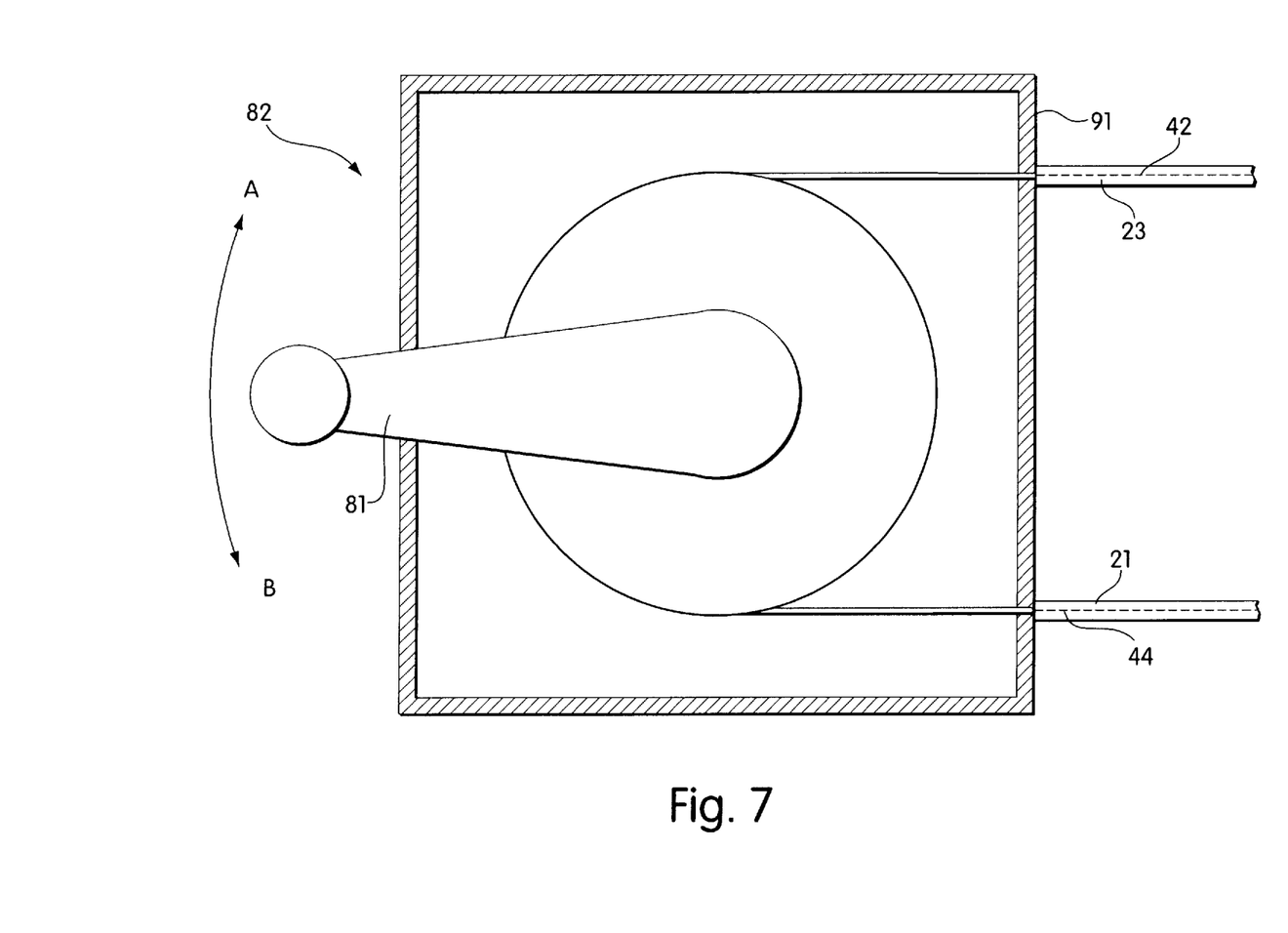
FIG. 7 is a schematic plan view of the handle and drum housing of the cable drive subassembly of the embodiment of FIG. 1.

The operation of cable drive subassembly 82, having longitudinal axis L, can be more clearly seen in FIGS. 6 and 7. Anti-backdrive subassembly 120, coaxial with axis L, comprises stem 122 having a first end 124 secured to a socket 126 formed in handle 81, and a second end 125. First end 124 is, in a preferred embodiment, notched to matingly engage with grooves in socket 126. The mating engagement of first end 124 and socket 126 ensures that stem 122 will rotate about axis L with rotation of handle 81. It is to be appreciated that other methods, well known to those skilled in the art, that is, those who are knowledgeable and experienced in this field of technology, may be used to engage first end 124 of stem 122 with handle 81.

Cup shaped drive plate 128, together with stem 122 forming a driving member, is secured to a middle portion of stem 122. The drive plate has a slot 130 formed in its sidewall, slot 130 defining first slot edge 132 and second slot edge 134, with slot edges 132, 134 extending substantially parallel to axis L.

Cup shaped spring housing 136 rotates freely about stem 122, and is positioned along stem 122 between first end 124 and drive plate 128. A biasing member, such as a coil spring 138 is nested within spring housing 136 such that it expands against the inner wall 140 of spring housing 136, whereby coil spring 138 and housing 136 form a driven member. First tab 142 and second tab 144 are formed on respective ends of the coil spring 138 and project radially inwardly toward the center of spring housing 136 as first and second engaging surfaces. Drive plate 128 nests within coil spring 138 such that first slot edge 132 abuts a first side of first tab 142 and second slot edge 134 abuts a first side of second tab 144 as indicated by the broken lines in FIG. 6.

A camming member such as a pinion gear 146 rotates freely about stem 122, and is positioned along stem 122 between second end 125 and drive plate 128, within which pinion gear 146 nests. A camming surface such as cam 148 projects from first end 149 of pinion gear 146 toward drive plate 128 along axis L, having first and second cam edges 150, 152. Cam 148 fits between first and second tabs 142, 144 such that first cam edge 150 abuts a second side of first tab 142 opposite the side of first tab 142 abutting first slot edge 132, and second cam edge 152 abuts a second side of second tab 144 opposite the side abutting second slot edge 134, as indicated by the broken lines in FIG. 6. Second end 154 of pinion gear 146 matingly engages with a recess (not shown) in drive drum 84 such that drive drum 84 rotates about axis L with the rotation of pinion gear 146 and vice versa. It is to be appreciated that pinion gear 146 need not necessarily be a gear, and that other methods of ensuring that it will rotate with drive drum 84 will be readily apparent to those skilled in the art.

Cable segment 44 is at least partially wrapped around drive drum 84 with second end 83 matingly engaging socket 87, formed in a surface of drive drum 84. A corresponding socket (not shown) is formed in an opposed surface of drive drum 84 to accommodate a corresponding second end (not shown) of cable segment 42, which partially wraps around drive drum 84 as well. The interaction of the mated cable ends and sockets prevents the cable segments from slipping around drive drum 84 as the handle 81 is rotated. Conduit 23 and conduit 21, which house cable segments 42 and 44, respectively, are secured to drum housing 91, thereby allowing cable segments 42 and 44 to extend to and wrap around drive drum 84 free of conduit.

When handle 81 is rotated in direction A, drive plate 128, being attached to stem 122 rotates as well in the same direction, causing first slot edge 132 to engage and exert a force on first tab 142. The force exerted on first tab 142 tends to compress coil spring 138 within spring housing 136, allowing coil spring 138 to rotate freely within spring housing 136. First tab 142 simultaneously engages first cam edge 150 on cam 148 as it rotates, thereby causing pinion gear 146 to rotate and turn drive drum 84 in direction A. As drive drum 84 rotates, cable segment 44 is wound onto drive drum 84 while cable segment 42 is correspondingly unwound. Cable segment 44 thereby pulls on slider pane 12, moving it to the right.

When handle 81 is rotated in the opposite, or B direction, the cable drive subassembly works similarly via second slot edge 134, second tab 144, and second cam edge 152 to rotate drive drum 84 in the B direction, whereby cable segment 42 is wound onto handle 81 and cable segment 44 is correspondingly unwound, causing slider pane 12 to be pulled to the left.

When a force is exerted directly on slider pane 12, for example, by grasping slider pane 12 to try and force it open, the anti-backdrive subassembly 120 works in a different manner to substantially prevent rotation of the drive drum 84. If slider pane 12 is partially open, and a force is exerted pulling slider pane 12 to the right, tension is created in cable segment 42. A force is in turn exerted on the second end of cable segment 42, which is constrained within its socket, thereby causing drive drum 84 to try and rotate in the A direction. As drive drum 84 tries to rotate, pinion gear 146 tries to rotate as well causing second cam edge 152 of cam 148 to engage second tab 144. This force on second tab 144 causes coil spring 138 to try and expand. Since coil spring 138 is contained within spring housing 136, it is constrained by inner wall 140 and cannot substantially expand further, thereby substantially preventing further rotation of pinion gear 146 and, necessarily, drive drum 84. Since drive drum 84 cannot rotate further, cable segment 42 cannot be pulled any further, thereby substantially preventing a further opening of sliding pane 12. The operation of the anti-backdrive subassembly 120 therefore provides for increased security of the vehicle since a partially opened slider pane cannot be opened substantially further, in addition to the ease of use and convenience provided by the remote operation of the modular sliding window assembly via operation of the handle.

Figure 8:
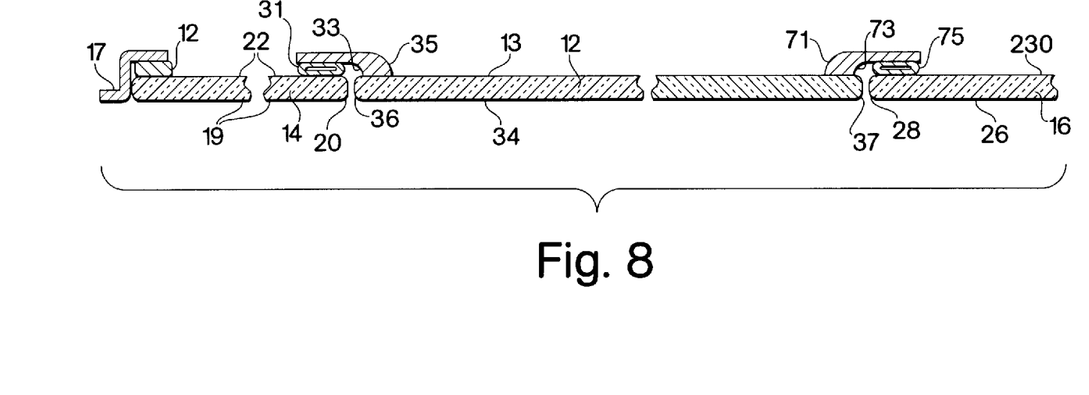
FIG. 8 is an enlarged section view showing the relative positioning of the fixed-position panes of the window assembly of FIG. 1, together with the center sliding pane in its closed position, along with selected other componentry of the assembly.

Referring now to FIG. 8, an alternate embodiment is shown. The right-side fixed pane 16 has an exterior surface 26, a perimeter edge 28 and an inside surface 230. Similarly, left-side fixed pane 14 has an outer surface 19, a perimeter edge 20 and an inside surface 22. Sliding pane 12 has an exterior surface 34 which, as best seen in FIG. 8, is substantially flush with the exterior surfaces of the fixed panes 14, 16 when the sliding pane 12 is in its closed position. It can be seen that the left-side vertical perimeter edge 36 of the sliding pane 12, in the closed position illustrated in FIG. 8, lies in alignment with, and in close proximity to, perimeter edge 20 of fixed pane 14. Similarly, right-side perimeter edge 37 of sliding pane 12 is aligned with and closely proximate to perimeter edge 28 of the right-side fixed pane 16.

Weather sealing can be provided at the upper and lower horizontal edges of sliding pane 12 in accordance with known techniques including, for example, the use of blade seals affixed to the frame 18, etc. In accordance with one preferred embodiment, weather sealing along the right- and left-side vertical edges of sliding pane 12 is provided by O-seals. Specifically, a left O-seal 31 is adhesively or otherwise affixed vertically to inside surface 22 of left-side fixed pane 14 at its periphery adjacent the sliding pane 12. A sealing flange 35 extends vertically along the periphery of inside surface 13 of sliding pane 12, and provides a sealing surface 33 which overlies, contacts and partially compresses O-seal 31. Similarly, another vertically-extending sealing flange 71 is affixed to the opposite periphery of the inside surface 13 of sliding pane 12, providing a sealing surface 73 which overlaps, contacts and partially compresses right-side O-seal 75, which is affixed along the vertical periphery of inside surface 230 of right-side fixed pane 16. An O-seal typically is provided as a length of resilient material having a round or oval cross section with an open center.

Figure 10:
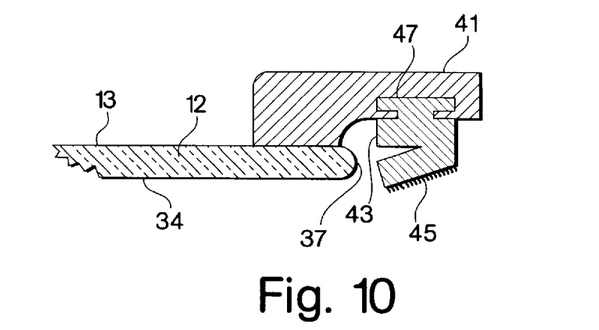
FIG. 10 is an enlarged partial schematic section view of an alternative embodiment of the sealing flange and associated components of FIG. 8.

In an alternative preferred embodiment, a weather seal is provided as a single, substantially continuous, full-circumference blade seal mounted around the perimeter of the sliding pane. Most preferably, the sliding pane subassembly provides a single sealing flange, much like flanges 35 and 71 but which extends around the entire inside perimeter of the sliding pane 12. The sealing flange preferably is formed of molded plastic, such as PVC, RIM, etc., most preferably being molded in place directly onto the surface of the sliding pane in accordance with known techniques. As can be seen in FIG. 10, full-circumference flange 41 can be provided in place of flange 71 to extend beyond the perimeter 37 of the sliding pane 12 and carry full-circumference blade seal 43. Blade seal 43 preferably is an extruded or otherwise molded member formed of natural or synthetic rubber, EPDM or other suitable material. It can be mounted as a single, continuous strip or in multiple pieces. Preferably its surface 45 which forms sealing contact with adjacent fixed panes or other surfaces of the window assembly is flocked in accordance with known techniques, to improve sliding contact as the sliding pane moves into and out of its closed position. The blade seal 43 can be mounted to the flange 41 in any suitable manner, including adhesively. In the preferred embodiment shown, blade seal 43 includes flanged mounting base 47 which slips into a correspondingly shaped recess in flange 41. This arrangement is found to provide ease of assembly and replacement. Alternative sealing materials and techniques will be readily apparent to those skilled in the art in view of the present disclosure.

Figure 9:
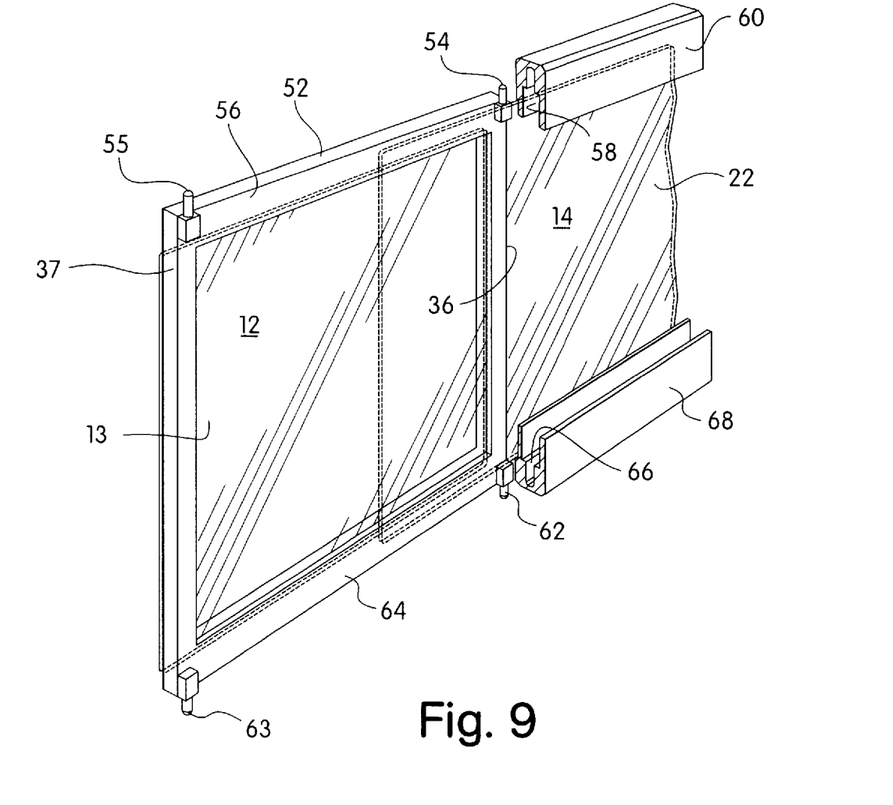
FIG. 9 is a schematic interior perspective view, partially broken away, of a window assembly in accordance with an alternative preferred embodiment of the modular sliding window assembly of FIG. 1.

The sliding pane optionally is provided as a subassembly comprising not only the transparent glazing panel of glass, plastic or a laminate thereof, but also a frame of molded plastic or the like extending partially or completely around the perimeter of the glazing panel. A subassembly of this type is illustrated in the alternative embodiment shown in FIG. 9. Thus, sliding pane 12 is shown in FIG. 9 to have perimeter rim frame 52. The left-side perimeter edge 36 of the sliding pane 12 is provided as the exposed left-side vertical surface of rim frame 52. (This edge surface appears at the right side of sliding pane 12 in FIG. 9, since FIG. 9 is a view from inside the passenger compartment.) Similarly, the vertical right edge of rim frame 52 provides perimeter edge 37 of the sliding pane. Alternatively, the perimeter edge of glass may be retained in the sliding pane sub-assembly, as a "raw" edge, i.e., an exposed surface, as in FIGS. 8 and 10 for example. It will be well within the ability of those skilled in the art to employ features or components additional or alternative to those described herein. Locking means, for example, may be provided, such as locking latch means mounted on the inside surface of the sliding pane or elsewhere in the window assembly, or numerous other well known locking means may be employed.

It is a significant advantage of the embodiment of FIG. 9 that guide means are provided for the sliding pane, comprising kick-out means for forcibly offsetting the sliding pane from its flush plane in its closed position toward a parallel plane substantially simultaneously with the initial lateral movement of the sliding pane toward its open position. Preferably, the guide means further comprises fixed members extending from the sliding pane or from the frame, and corresponding guide channels in the other of them, to receive the fixed members. The fixed members, most preferably, extend from the sliding pane, as in the embodiment illustrated in FIG. 9, and, correspondingly, the guide channels are provided in the frame. More specifically, sliding pane 12 is seen in FIG. 9 to have upper pins 54 and 55

(being left-side and right-side pins, respectively, as viewed from outside the vehicle) extending upwardly from upper horizontal member 56 of rim frame 52 into upper guide channel 58 in upper, horizontally-extending frame portion 60. Similarly, lower pins 62 and 63 extend downwardly below the sliding pane 12 from a lower horizontal portion 64 of rim frame 52, into a lower guide channel 66 provided in a horizontally-extending lower frame portion 68. The pins preferably are spring loaded or otherwise biased in the vertical direction to reduce or eliminate window rattle. Only the top pins or, more preferably, the bottom pins need be biased. This preferred feature is found to aid also in simplifying the assembly and disassembly of the window, by permitting the pins to be retracted to enter or escape the guide channels. It can be seen that the guide channels are formed simply as a recess in the frame members. Alternatively, auxiliary brackets or appliqués may be added to the frame to form the guide channels, perhaps in cooperation with the main body of the frame. Also, channel liners, such as U-shaped inserts, may be used to more easily control sliding friction, channel dimensions, etc. Also, as noted above, blade seals and other known components may be added.

Figure 11:
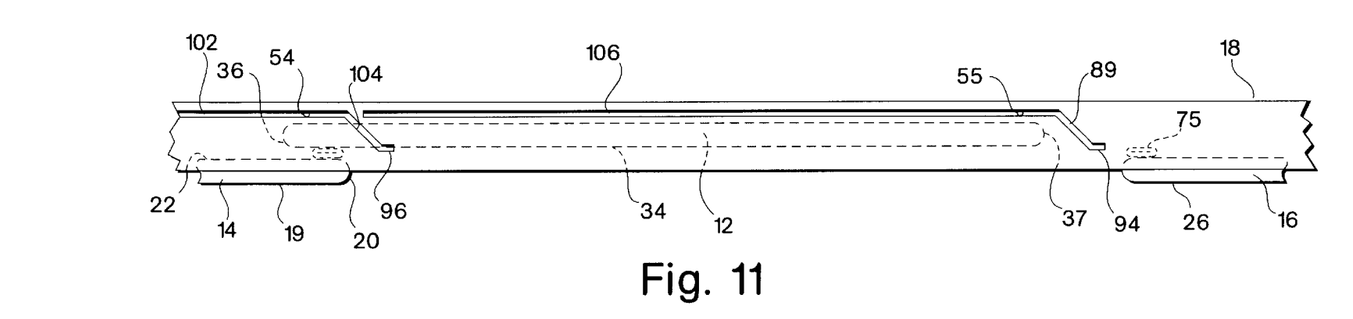
FIGS. 11 and 12 are schematic views, partially in section and partially broken away, of the fixed-position panes and center sliding pane of the window assembly of FIG. 9, illustrating a preferred embodiment of the guide means for guiding the sliding pane as it moves between its open position (FIG. 11) and closed position (FIG. 12)
Figure 12:
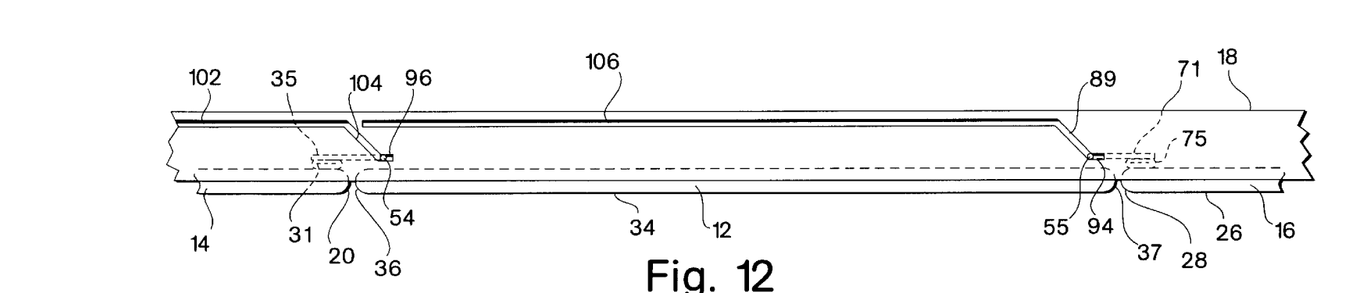

The kick-out means, most preferably, is provided by the frame, although it alternatively can be carried by the sliding pane, particularly in those embodiments in which the fixed pins extend from the frame. A preferred embodiment of kick-out means provided by the frame in the form of guide ramps for engaging fixed members such as the guide pins shown in FIG. 9, is illustrated in FIGS. 11 and 12. A left-side upper guide channel 102 is shown to incorporate ramp surface 104 and right-side upper guide channel 106 correspondingly incorporates ramp surface 89. Like guide channels would, of course, be provided in the lower horizontal portion of the frame. Guide pin receiving sockets 96 and 94 are provided at the ends of ramp surfaces 104 and 89, respectively. The guide pins 54, 55 merely seat into such sockets as the sliding pane reaches its closed position, as seen in FIG. 12. The sockets are dimensioned to permit essentially no inward offsetting travel except simultaneously with lateral travel as the sliding pane 12 is moved toward its open position.

Figure 13:
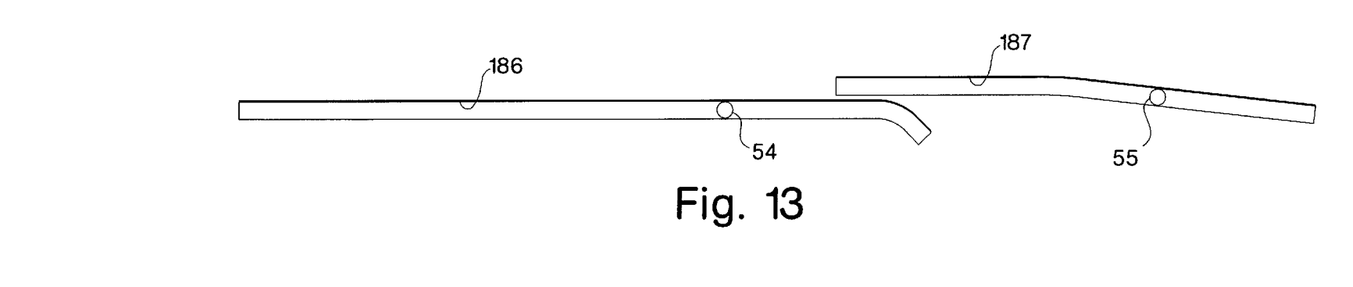
FIG. 13 is a schematic representation of an alternative embodiment of the guide means of FIG. 9.

In this regard, it is optional that both vertical edges of the sliding pane 12 be offset substantially symmetrically and simultaneously during initial movement of the sliding pane from its closed position. Thus, opposite vertical edges 36 and 37 of the sliding pane 12 each follows the same path of travel. Alternatively, however, it is possible to aggressively offset only the leading edge 36 of the sliding pane upon initial lateral travel, allowing the trailing edge (i.e., opposite edge 37) to follow a less aggressive path of travel. That is, the trailing edge would be more gradually offset in the sense of being offset a shorter distance per unit of lateral travel distance. FIG. 13 shows a pin and guide channel arrangement which is a modification of that seen in FIGS. 11, 12. In FIG. 13 the leading edge follows a more aggressive offset than does the trailing edge. Left-side upper guide channel 186 receiving upper pin 54 is substantially the same as channel 102 in FIGS. 11, 12. Right-side upper guide channel 187, however, offsets more gradually. Advantageously in this embodiment, when the sliding pane is in its closed position, the upper and lower guide pins at the trailing edge are provided enhanced support by the guide channel wall against inward force. Guide channel 187 is seen to extend behind channel 186, permitting full opening of the sliding pane 12. In the embodiment of FIG. 13, the right-side channel 187 is moved inwardly and extends behind (i.e., inside of) left-side channel 186. This may require a wider frame member, at least in the area where the channels overlap. The sliding pane 12 in its open position may be slightly angled to the fixed position pane 14 (although still substantially parallel to it) as a result of channel 187 being extended behind channel 186. Alternatively, channel 187 can simply be offset inwardly along its entire length. The guide pins traveling in channel 187 and the corresponding lower channel in that case preferably are offset inwardly also. While a somewhat thicker frame and a somewhat thicker sliding pane subassembly may be required to accommodate such arrangement, fill lateral travel can be achieved with the sliding pane 12 parallel to the adjacent fixed pane 14 in both its open and closed positions.

Figure 14:
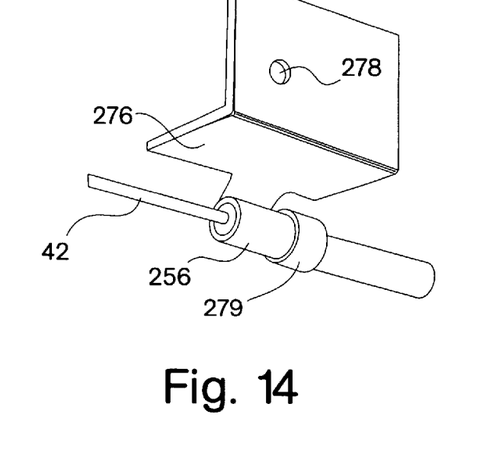
FIGS. 14–18 illustrate bracketry suitable for a retrofitting method and kit in accordance with a preferred embodiment for converting a manually operated slider pane to a remotely operated sliding window.
Figure 15:
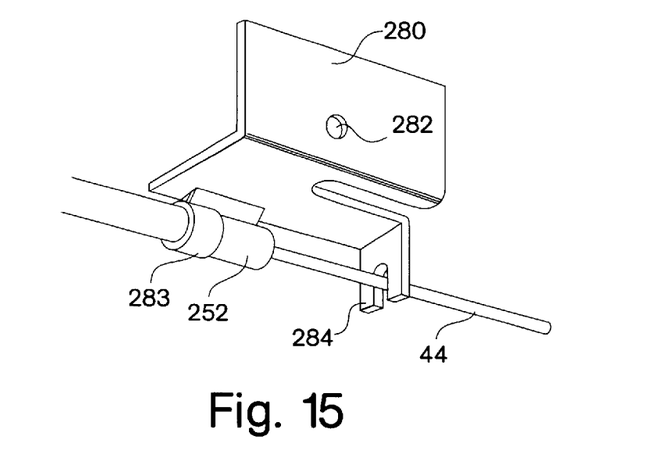

In accordance another preferred embodiment, a retrofitting method and apparatus are provided comprising bracketry and pull-pull cable drive componentry for converting a manually operated slider window to a remotely operated slider construction having a handle in accordance with the principles discussed above. Specifically, left side and right side conduit attachment brackets are provided for attachment to the frame and/or to fixed-position panes or the like of the window construction at locations laterally remote from the travel range of the slider pane. FIG. 14 illustrates a left side conduit attachment bracket suitable for mounting to the upper horizontal portion of the frame. Bracket 276 is seen to have a mounting hole 278 for receiving a mounting rivet, screw or, more preferably, a mating stud projecting from the surface of the frame. Optionally multiple mating studs can be provided for positioning and affixing the bracket 276 to the frame. Such mating studs can be formed during initial molding of the frame as unitary nubs or projections from the surface of the frame. Right side frame 280 is seen in FIG. 15 also to have a mounting hole 282 suitable for receiving a mating stud projecting from the frame. In the alternative, studs or nubs can be formed on the brackets to be received into corresponding sockets or holes in the surface of the frame at the mounting location. Left conduit attachment bracket 276 further comprises conduit flange 279 adapted to receive and releasably hold conduit end 256 of left side drive cable segment 42. Similarly, right conduit attachment bracket 280 has conduit flange 283 for receiving and releasably holding conduit end 252 associated with drive cable segment 44. In addition, drive cable guide 284 of bracket 280 serves to aid in guiding the drive cable from bracket 280 to its attachment to the slider pane.

Figure 16:
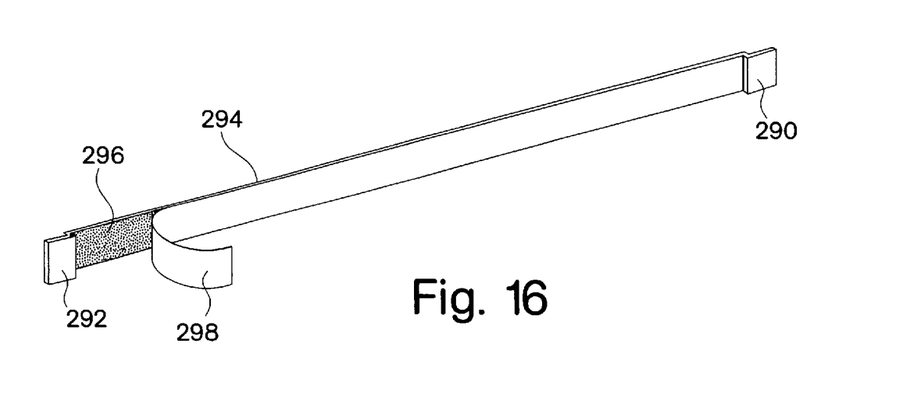
Figure 17:
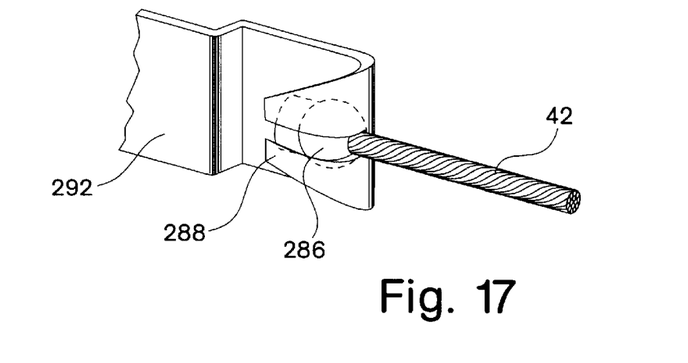
Figure 18:
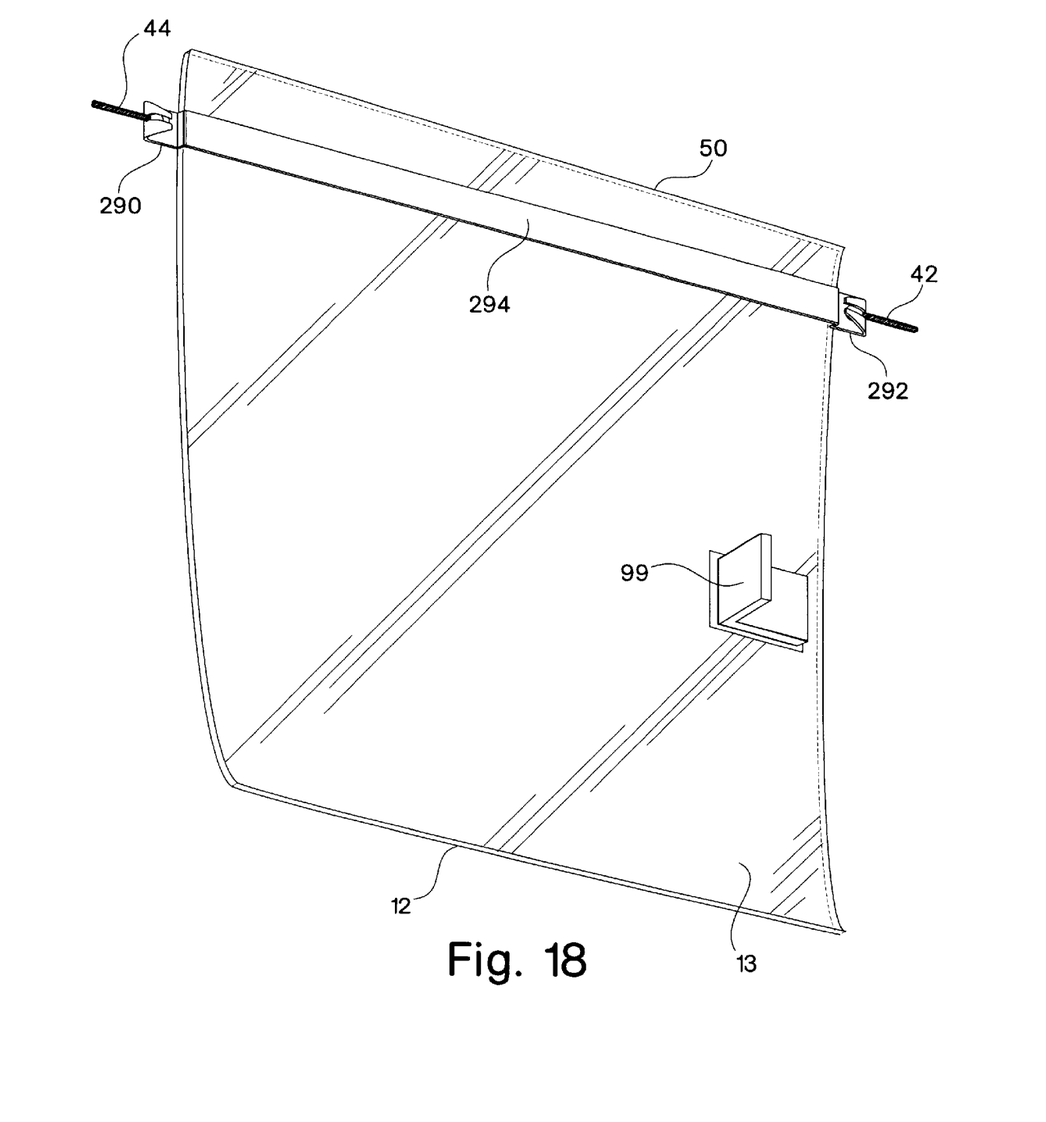

Left and right cable fasteners are attached to the slider pane at locations laterally spaced from each other. Preferably, each end of the drive cable attached to the slider pane is fitted with a ball or lug in accordance with well known design techniques. Thus, as seen in FIG. 17, the end of drive cable segment 42 is fitted with lug 286. A corresponding lug would be fitted to the end of drive cable segment 44, extending to the slider pane from the right. A left cable fastener 292 is illustrated in FIG. 17, having slotted flange 288 for receiving and releasably holding a cable end fitting, specifically, lug 286 at the end of drive cable segment 42. In accordance with one preferred embodiment, as illustrated in FIG. 16, left and right cable fasteners 292, 290, having the above described slotted flange design, are formed at opposite ends of an elongate bracket 294. Bracket 294 has an adhesive surface, specifically, offset surface 296 for adhesive attachment to a surface, preferably the inside surface of the slider pane. A removable film 298 is provided to protect the adhesive of surface 296 until such time as it is to be attached to the slider pane. FIG. 18 illustrates a slider pane 12 to which cable fastener bracket 294 has been attached. The end of left side drive cable segment 42 is attached to slotted flange cable fastener 292 in accordance with the embodiment illustrated in FIG. 17. Similarly, the end of right side drive cable segment 44 is attached to slotted flange cable fastener 290. It can be seen that elongate bracket 294 is attached to the slider pane 12 proximate its upper edge. Preferably, bracket 294 is attached at a height which corresponds generally to the cable height established by the conduit attachment brackets positioned on the frame to the left and right of the slider pane in accordance with the discussion above.

In addition to the retrofit bracketry and drive cable described above, retrofitting kits disclosed here, in accordance with preferred embodiments, further include a handle connected to a drive drum contained within a housing, the drive cable being connected to the drive drum, the housing, drive drum and handle being preferably mounted at an overhead location within arms reach of the driver as discussed in previous embodiments. Preferably, such retrofitting kit further comprises installation instructions, templates and the like, to facilitate the retrofitting of a manually operated slider window to be remotely operated with a handle. Optionally, manual operation componentry, such as handle 99 attached to inside surface 13 of slider pane 12 in FIG. 18, can be removed in the course of the retrofitting.

In light of the foregoing disclosure of the invention and description of certain preferred embodiments, those who are skilled in this area of technology will readily understand that various modifications and adaptations can be made without departing from the true scope and spirit of the invention. All such modifications and adaptations are intended to be covered by the following claims.

I claim:

1. A modular window assembly vertically mounted in a motor vehicle body having a windshield and a roof, enclosing a passenger compartment, the modular window assembly comprising, in combination:

a circumferential rear-mounted frame member mounted in a window recess in the vehicle body rearward of a driver's seat;

a slider subassembly comprising a sliding pane mounted in the rear-mounted frame member to slide laterally back and forth between an open position and a closed position; and a drive subassembly to move the slider subassembly laterally back and forth between its open and closed positions, the drive subassembly comprising:

a manually-operable drive unit secured to the roof of the vehicle remote from the rear-mounted frame member; and an anti-backdrive subassembly for substantially preventing movement of the slider subassembly between its open and closed positions by forces other than operation of the manually-operable drive unit.

2. The modular window assembly in accordance with claim 1 wherein the drive subassembly further comprises a drive member attached to the slider subassembly to pull the slider subassembly substantially laterally in a first direction toward its open position upon movement of the drive unit in a first direction, and for pulling the slider subassembly substantially laterally in a second direction toward its closed position upon movement of the drive unit in a second direction.

3. The modular window assembly in accordance with claim 2 wherein the drive unit comprises a drive drum housing containing a drive drum, the anti-backdrive subassembly being connected to the drive drum, a handle being connected to the anti-backdrive subassembly, the drive member comprises a drive cable attached to the slider subassembly and wrapped around the drive drum for pulling the slider subassembly, the slider subassembly and drive cable together forming a closed loop from the drive drum, with a first drive cable segment extending laterally from the slider subassembly toward a left side of the frame member and a second drive cable segment extending laterally from the slider subassembly toward a right side of the frame member.

4. The modular window assembly in accordance with claim 3 wherein the anti-backdrive subassembly comprises:

a driving member engageable with the handle;

a driven member driven by the driving member to rotate with rotation of the handle; and a camming member engageable with the drive drum and driven by the driven member to rotate with rotation of the handle and to substantially prevent rotation of the drive drum by forces exerted directly on the slider subassembly.

5. The modular window assembly in accordance with claim 4 wherein the driving member comprises a stem having opposed first and second ends, the first end engaging the handle, and a drive plate having a slot formed therein defining first and second slot edges, the drive plate being secured to a middle portion of the stem, the driven member comprises a housing freely rotatable about the stem between the drive plate and the first end and a biasing member contained within the housing having a first engaging surface proximate and engageable with the first slot edge and a second engaging surface proximate and engageable with the second slot edge, the biasing member being movable in a first direction within the housing when the first slot edge engages the first engaging surface and in a second direction when the second slot edge engages the second engaging surface, the camming member having a camming surface at a first end thereof and engaging the drive drum at a second end thereof, the camming member being freely rotatable about the stem between the drive plate and the second end, the camming surface being proximate and engageable with the first and second engaging surfaces, the biasing member substantially preventing rotation of the drive drum member when the camming surface engages the first and second engaging surfaces.

6. The modular window assembly in accordance with claim 5 wherein the biasing member comprises a coil spring, a first end of the coil spring projecting radially inwardly toward a center of the housing forming the first engaging surface, and a second end of the coil spring projecting radially inwardly toward the center of the housing forming the second engaging surface.

7. The modular window assembly in accordance with claim 6 wherein the housing is cup shaped, the coil spring nests within the housing, the drive plate nests within the coil spring, and the camming member nests within the drive plate.

8. The modular window assembly in accordance with claim 7 wherein the camming surface defines first and second cam edges, the first cam edge abutting a first side of the first engaging surface, the first slot edge abutting an opposed second side of the first engaging surface, the second cam edge abutting a first side of the second engaging surface, the second slot edge abutting an opposed second side of the second engaging surface.

9. The modular window assembly in accordance with claim 8 wherein engagement of the first and second slot edges with the first and second engaging surfaces causes the coil spring to compress within the housing.

10. The modular window assembly in accordance with claim 8 wherein engagement of the first and second cam edges with the first and second engaging surfaces causes the coil spring to expand within the housing.

11. The modular window assembly in accordance with claim 5 wherein the camming member comprises a pinion gear having a projection extending from the first end forming the camming surface, the pinion gear matingly engaging with a chamber formed in the drive drum.

12. The modular window assembly in accordance with claim 3 wherein the drive unit is secured to the roof of the vehicle and the drive cable extends between the roof and a roof liner attached to the roof.

13. The modular window assembly in accordance with claim 3 wherein the drive unit is located proximate the windshield.

14. The modular window assembly in accordance with claim 3 wherein the handle extends and rotates within the passenger compartment of the vehicle in a plane substantially parallel to the roof.

15. A modular window assembly vertically mounted in a motor vehicle body having a windshield and a roof, enclosing a passenger compartment, the modular window assembly comprising, in combination:
   a circumferential rear-mounted frame member mounted in a window recess in the vehicle body comprising:
      a slider subassembly comprising a sliding pane mounted in the rear-mounted frame member to slide laterally back and forth between an open position and a closed position; and
      a pull-pull cable drive subassembly to move the slider subassembly laterally back and forth between its open and closed positions, the pull-pull cable drive subassembly comprising:
         a drive drum mounted to the roof of the vehicle body remote from the rear-mounted frame member;
         an anti-backdrive subassembly connected to the drive drum to substantially prevent movement of the slider subassembly between its open and closed positions by forces other than operation of a handle connected to the anti-backdrive subassembly; and
         a drive cable attached to the slider subassembly and wrapped around the drive drum for pulling the slider subassembly substantially laterally in a first direction toward its open position upon rotation of the handle in a first rotational direction, and for pulling the slider subassembly substantially laterally in a second direction toward its closed position upon rotation of the handle in an opposite rotational direction, the slider subassembly and drive cable together forming a closed loop from the drive drum, with a first drive cable segment extending laterally from the slider subassembly toward a left side of the frame member and a second drive cable segment extending laterally from the slider subassembly toward a right side of the frame member.

16. The modular window assembly in accordance with claim 15 wherein at least a portion of the first drive cable segment extends in a first cable channel in a substantially horizontal upper portion of the frame member, and at least a section of the second drive cable segment extends in a second cable channel in the upper portion of the frame member.

17. The modular window assembly in accordance with claim 16 wherein at least a portion of the first and second channels has a closed cross-sectional configuration.

18. The modular window assembly in accordance with claim 15 wherein a portion of the drive cable extends from the slider subassembly to the drive drum between the roof and a roof liner attached to the roof.

19. The modular window assembly in accordance with claim 15 further comprising at least one fixed-position pane mounted to the frame member, an outside surface of the sliding pane in its closed position being in a plane, substantially flush with an outside surface of the fixed-position pane, and in its open position being in an offset plane substantially parallel to the first plane, substantially overlapping the fixed-position plane;
   guide means for guiding the sliding pane as it moves in a path of travel between its open and closed positions, the guide means comprising:
      guide channels extending in the frame member and defining the path of travel,
      fixed members extending from the sliding pane into the guide channels, and
      kick-out means provided by the frame member for engaging the fixed members at least during initial lateral movement of the sliding pane in its path of travel from its closed position toward its open position, to forcibly guide the sliding pane from the first plane toward the second plane substantially simultaneously with said initial lateral movement of the sliding pane from its closed position toward its open position.

20. The modular window assembly in accordance with claim 19 further comprising first and second fixed-position panes substantially flush with each other, the sliding pane in its closed positions being between, and substantially flush with, both of the fixed-position panes.

21. The modular window assembly in accordance with claim 19 further comprising sealing means for providing a substantially weather-tight seal between the sliding pane in its closed position and the fixed pane.

22. The modular window assembly in accordance with claim 21 wherein the sealing means comprises an O-seal extending on the inside surface of the fixed-position pane proximate its peripheral edge adjacent the sliding pane, and a sealing flange extending from the inside surface of the sliding pane outwardly toward the fixed-position pane, having a flange surface seated against and at least partially compressing the O-seal.

23. The modular window assembly in accordance with claim 21 wherein the sealing means comprises an elastomeric, full-circumference blade seal mounted to a full-circumference sealing flange extending from the inside surface of the sliding pane.

24. A modular window assembly vertically mounted in a motor vehicle body having a windshield and a roof, enclosing a passenger compartment, the modular window assembly comprising, in combination:
   a circumferential rear-mounted frame member mounted in a first plane in a window recess in the vehicle body rearward of a rearmost edge of a driver's door;
   a slider subassembly comprising a sliding pane mounted in the rear-mounted frame member to slide laterally back and forth between an open position and a closed position; and a drive subassembly to move the slider subassembly laterally back and forth between its open and closed positions, the drive subassembly comprising:
  a manually-operable drive unit comprising a hand crank mounted in a second plane different from the first plane forward of the rearmost edge of the driver's door; and an anti-backdrive subassembly for substantially preventing movement of the slider subassembly between its open and closed positions by forces other than operation of the manually-operable drive unit.

* * * * *